United States Patent [19]
Unigovsky et al.

[11] 3,745,319
[45] July 10, 1973

[54] APPARATUS FOR RESISTANCE BUTT WELDING OF SEVERAL PIPES INTO EXTENDED SECTIONS

[76] Inventors: Mikhail Rakhmilevich Unigovsky, ulitsa Pushkina, 21, kv. 33; Julian Konstantinovich Konovalov, ulitsa Saxaganskogo, 31, kv. 5a; Evgeny Vasilievich Rulevsky, ulitsa Vyshgorodskaya, 31, kv. 64; Petr Ivanovich Zakrevsky, ulitsa P. Mirnogo, 27, kv. 1; Veniamin Solomonovich Rotenfeld, ulitsa Vyshgorodskaya, 31, kv. 40; Anatoly Ivanovich Chvertko, Bulvar Lesi Ukrainki, 2, kv. 21; Vladimir Konstantinovich Lebedev, ulitsa Engelsa, 25, kv. 12; Tsezar Bronislavovich Golenzovsky, ulitsa K. Marxa, 11, kv. 64; Georgy Vasilievich Gorbunov, Bulvar Lesi Ukrainki 2, kv. 41, all of Kiev; Vladimir Ivanovich Prokofiev, ulitsa 14 Parkovaya, 3, kv. 33, Moscow; Konkordy Ivanovich Zaitsev, Leninsky prospekt, 62/1, kv. 172, Moscow; Viktor Senderovich Lifshits, Kavkazaky bulvar, 21, korpus 2. kv. 41, Moscow; Oleg Sergeevich Papkov, Smarkandsky bulvar, 24, korpus 3, kv. 3, Moscow; Georgy Nikolaevich Petrov, Izmailovsky bulvar, 34/32, kv. 8, Moscow, all of U.S.S.R.; Mark Davidovich Litvinchuk, deceased, late of Bulvar Lesi Ukrainki, 2, kv. 21, Kiev, U.S.S.R. Sofia Isaakovna Litvinchuk, administrix

[22] Filed: Aug. 25, 1971

[21] Appl. No.: 174,764

[52] U.S. Cl. .................................. 219/101, 219/59
[51] Int. Cl. ............................................. B23k 9/02
[58] Field of Search ..................... 219/59, 101, 103, 219/104, 158, 161

[56] References Cited
UNITED STATES PATENTS
1,922,913   8/1933   Free et al. ............................ 219/59
2,193,490   3/1940   Rehse .................................. 219/101
3,134,012   5/1964   Neukom .............................. 219/101

*Primary Examiner*—J. V. Truhe
*Assistant Examiner*—L. A. Schutzman
*Attorney*—Holman & Stern

[57] ABSTRACT

An apparatus for resistance butt welding of several pipes into extended pipe lengths. The apparatus uses a conveyor-type transport device for feeding the pipes to a butt-welding machine, trimmers for the removal of external and internal weld burrs, and skids for delivering single pipes to the transport device.

3 Claims, 2 Drawing Figures

APPARATUS FOR RESISTANCE BUTT WELDING OF SEVERAL PIPES INTO EXTENDED SECTIONS

BACKGROUND OF THE INVENTION

The present invention relates to apparatus for resistance butt welding of several pipes to obtain extended pipe lengths employed in the construction of main and oil-or-gas-field pipe lines.

DESCRIPTION OF PRIOR ART

Known at present are apparatus for welding several lengths of pipe into extended pipe lengths or a continuous string of pipe, comprising, essentially, a welding machine moved along the route of the pipe line to be laid by means of a pipe laying boom; and the pipes are joined together by the application of the resistance butt welding method.

Power to the welding machines is expediently supplied by a mobile power plant hauled by the pipe laying boom itself.

Welding completed, internal weld burrs are removed through the use of an internal trimmer, while the external burrs are chipped off by a pneumatic tool.

Typical of such prior art apparatus is an inadequate output, owing to the considerable time spent on various ancillary operations, such as aligning of the pipes in the welding machine, removal of burrs, cleaning of pipes for applying die blocks of the welding machine; the inadequate output is also due to a low speed of travel under cross-country conditions. In addition, inherent in the above apparatus is a low welding rate (up to 500 meters of the pipe line per shift) resulting from welding single pipes up to 12.5 meters long, which does not meet the requirements of modern technology in large-scale construction of pipe lines.

At present in compliance with the requirements for the maximum mechanization of operations on construction of pipelines, single lengths are joined together at pipe welding stations into sections up to 40 meters long by the application of arc welding processes, the automatic submerged arc welding process being among them. Then the sections are handled to the route, where they are joined together by welding into a continuous string.

FIELD OF THE INVENTION

An essential object of the present invention is to provide an apparatus for resistance butt welding of several pipes into extended pipe lengths, featuring a high output.

Another object of the invention is to provide an apparatus for resistance butt welding of several pipes to obtain extended pipe lengths, which apparatus would allow a substantial reduction in the cost of both the welding and mounting operations during the construction of pipe-lines. These and other objects of this invention are achieved by the fact that an apparatus for resistance butt welding of pipes into extended sections, incorporating a welding machine and a trimmer for removing internal burrs and means to drive the trimmers, is provided, according to the invention, with a conveyor-type transport device for handling the pipes, with a trimmer for removing external burrs referred to hereinafter as the external trimmer which is mounted on the transport device in front of the welding machine and disposed coaxially with the latter, and with a trimmer for the removal of internal burrs, referred to as the internal trimmer; the apparatus is also equipped with skids intended for feeding single pipes to the transport device, abutting upon the transport device and disposed at right angles to its axis in front of the external trimmer with the working tool of the internal trimmer being located between the clamps of the welding machine and coupled through a rod and a shaft with its drives, installed on a carriage which is fast on the transport device behind the welding machine.

BRIEF DESCRIPTION OF THE DRAWINGS

To make the essence of the present invention more fully apparent the description is illustrated by the appended drawings depicting exemplary embodiments of the proposed machine apparatus, conforming to the invention.

DESCRIPTION OF THE PREFERRED EMBODIMENT

Figure 1:
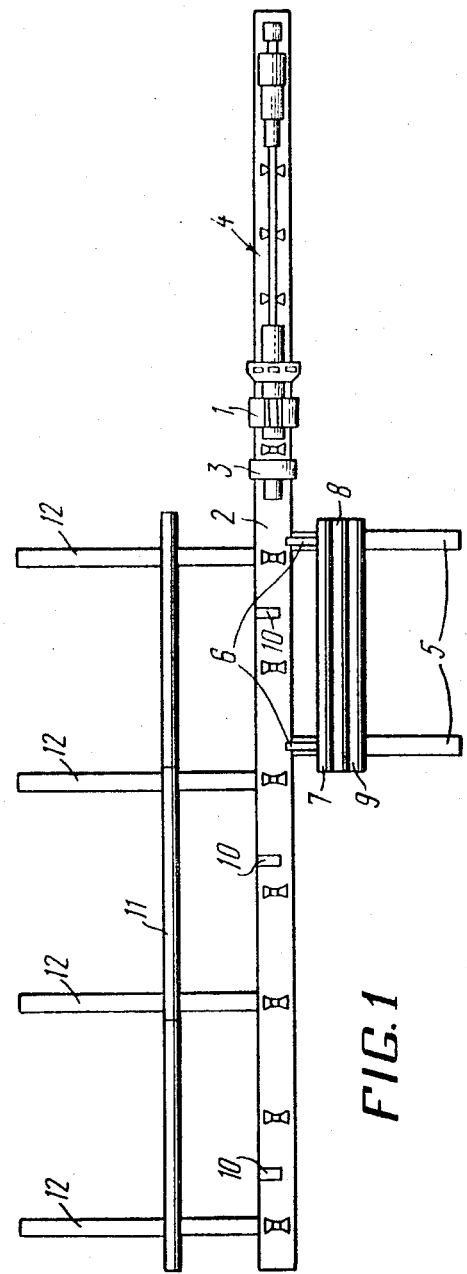
FIG. 1 is a layout of the apparatus for welding several lengths of pipe into extended pipe lengths (top view)

The apparatus as illustrated in the drawings, consists of a resistance butt welding machine 1 (FIG. 1) fastened on a transport device which is roll table 2, the external trimmer 3 for removing external burrs attached to the table frame in front of the welding machine and coaxial with it; the external trimmer 4 for removing internal burrs mounted coaxially with trimmer 3 and welding machine 1 and skids 5 for delivering separate pipes to the roll table 2.

Skids 5 border with roll table 2 in front of trimmer 3 and are disposed perpendicular to the axis of table 2 with a slope towards its working plane.

At the point the skids 5 abut upon roll table 2, the latter carries fastened on it shut-down reloaders 6 which serve for discontinuing alternately the delivery of separate pipes 7, 8 and 9 and loading them to roll table 2.

Secured on the frame of roll table 2 are also kick-offs 10 intended for transferring welded pipe section 11 from roll table 2 to skids 12 leading to a finished product storage.

Internal trimmer 4 (FIG. 2) incorporates double-ended hollow rod 13 and a pneumatic cylinder 14. One end of rod 13 is coupled to spatter arresting cone 15, whereas its other end is connected to the housing of electric motor 16. Shaft 17 enclosed in hollow rod 13 is connected with the shaft of electric motor 16 and with working tool 18 of the internal trimmer 4.

The working tool 18 is disposed between clamps 19 of welding machine 1. Both the pneumatic cylinder 14 and electric motor 16 are mounted on carriage 20 which during the welding operation is fast on guides 21 of the frame of roll table 2.

The above-described apparatus functions as follows.

Figure 2:
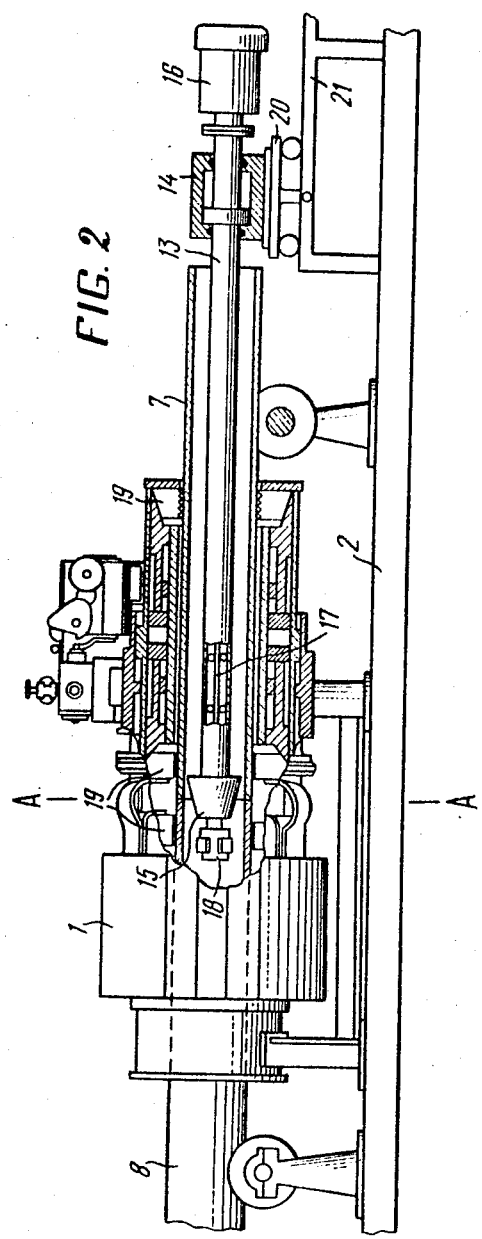
FIG. 2 is a fragmentary cut-away view of the apparatus of FIG. 1.

A pipe 7 (FIG. 1) placed on skids 5 is handled on roll table 2 by shut-down reloaders 6, whereupon it is conveyed towards the welding machine 1 until the left-hand face end of pipe 7 coincides with section A—A (middle point) of the welding machine (FIG. 2).

Following this pipe 7 is gripped by clamps 19 of the welding machine 1, the clamps being located on the right-hand side of the machine. In the course of travel of pipe 7 internal trimmer 4 is enclosed within the pipe. Then with the aid of shut-down reloaders 6 the pipe 8 is delivered to roll table 2 being also towards welding machine 1 until it comes in contact with the clamped pipe 7. After this pipe 8 is gripped by clamps 19 of welding machine 1, which clamps are located on the left-hand side of the machine. As a result pipes 7 and 8 are lined up. In this position, the spatter arresting cone 15 is located in the joint zone of pipes 7 and 8.

Next pipes 7 and 8 are joined together end to end through the use of an automatic resistance butt welding process. As soon as the welding operation is completed, air is fed automatically into the left-hand chamber of air cylinder 14 of trimmer 4. As a result the rod 13 is shifted to the right, with working tool 18 of trimmer 4 being disposed in plane A—A of the joint. At this juncture electric motor 16 is automatically cut in and via shaft 17 imparts rotation to the working tool 18 of trimmer 4.

When the internal burrs are removed, the motor 16 is switched off and air is fed into the right-hand chamber of air cylinder 14, by which the rod 13 is returned to its original position.

The next step is that of releasing the pipe section, made up of pipes 7 and 8, from clamps 19.

At this stage, the roll table 2 is started and the section of two pipe lengths welded together is moved to the left to the station where external burrs are removed. The welded joint of pipes 7 and 8 is stopped just under the working tool of trimmer 3 and trimming is performed. After the external burrs have been removed, the double lengths of pipe is handled counterclockwise until its right face end is on the left-hand side of the left face end of pipe 9, resting at that moment on skids 5. Following this, the next pipe is loaded by means of shutdown reloader 6 on roll table 2 which advances together with the double length section towards welding machine 1 until the left-hand face end of pipe 9 coincides with section A-A through welding machine 1. Next the pipe 9 is gripped by clamps 19 of welding machine 1, which clamps are located on the right-hand side of the machine. As pipe 9 is conveyed, trimmer 4, which serves to remove internal burrs, is enclosed in the pipe, following which the double length section passes by means of the roll table to the right, until it establishes an end-to-end contact with the already clamped pipe 9. Now clamps 19 arranged on the left-hand side of welding machine 1 grip the double length section with the ensuing alignment of pipe 9 with the above section. The next operation is automatic resistance butt welding of pipe 9 to the aforesaid section. As soon as the welding process is completed, air is automatically fed into the left-hand chamber of air cylinder 14 incorporated in trimmer 4. As a result rod 13 is forced clockwise and working tool 18 of the trimmer 4 will be disposed in the joint plane. Next, electric motor 16 is cut in and the driving working tool 18 of trimmer 4, is actuated, and internal burrs are removed. Subsequently motor 16 is switched off and the right-hand chamber of cylinder 14 is filled with pressurized air, which causes rod 13 to return to its original position. Now comes the operation of releasing the welded triple length section from the welder 1 clamps. Next, the roll table 2 starts moving and the welded section 11 of three pipe lengths is passed to the left to a station where external burrs will be removed. The joint between pipes 9 and 7 is stopped under the working tool of trimmer 3. The latter is started to remove external burrs. On completion of this operation the triple-length section 11 is moved counterclockwise, whereupon all the operations involved in welding the next pipe are repeated.

The number of short pipes which may be welded into one length is dependent on the length of roll table 2 on the left-hand side of trimmer 3.

If the production of triple-length section 11 was specified, it will move counterclockwise on roll table 2 until the right-hand face end of the section is disposed to the left from external trimmer 3. Next, the triple-length section 11 through the use of kicks-off 10 is removed from table 2 and passed on to skids 12 to enter the finished product storage.

In the course of welding, droplets of molten metal are leable to stick to the spatter arresting cone 15. In order to clean the cone of the trimmer 4, the carriage 20 is wheeled out along guides 21 of the frame of roll table 2 beyond the limits of welding machine 1. The spatter arresting cone 15 shall preferably be cleaned from metal dribbles several times per shift. On completion of this operation trimmer 4 is again rolled on carriage 20 into machine 1 with the carriage being fixed on guides 21 of the table frame.

The proposed apparatus makes it possible to increase the output, as compared to the known machines, by 5 to 6 times and to weld up to 150 pipes into sections up to 40 meters long.

In addition, depending on the diameter of the pipes to be welded the above apparatus allows a 1.7 to 2.5-fold reduction in the cost of both the welding and erecting operations.

What is claimed is:

1. An apparatus for resistance butt welding of two and more short pipes end-to-end to form an extended pipe length, comprising: an elongate elongated table having a butt-welding unit rigidly mounted thereon; means to move a pipe axially and along the length thereof from a front of the butt welding unit into a region of the butt-welding unit; clamp means provided to cooperate with the butt-welding unit for clamping pipes to be welded end to end; an external trimmer means mounted at the front of the butt-welding unit for removing external circumferential burrs from a pipe-weld; an internal trimmer means disposed concentrically of said external trimmer means for removing internal burrs from a pipe weld, and including a rotatable shaft means having a cutting tool means and rotating axially within a non-rotating guiding hollow rod, said internal trimmer means being disposed in said region of the butt-welding unit and extending axially towards a rear of the butt-welding unit; drive means to rotate said rotatable shaft together with said cutting tool; a movable carriage supporting said drive means and said internal trimmer means, disposed at the rear of the butt-welding unit and having roller means for enabling move-ment of the carriage on and along the elongated table; and skid means abutting on and extending laterally of said elongate table for feeding a new short-pipe into the region of the butt-welding unit when the internal trimmer means is retracted on said carriage in a direction away from the butt-welding unit, whereby, the length of the internal trimmer means may be limited to the length of a single pipe even though three or more short pipes are welded end to end, and, removal of the internal welding burrs is done in a red-hot state using one and the same clamp means as of the butt-welding unit.

2. An apparatus as of claim 1 wherein said drive means includes an electric motor, and wherein the apparatus further includes reciprocatory means provided in the form of a cylinder and a piston operating therein, said piston being coupled with said hollow rod, so that the cutting tool of the internal trimmer means may be axially moved onto alignment with an internal weld-burr to effect removal thereof.

3. An apparatus as in claim 1, which further includes a spatter arresting cone mounted at an end of said hollow rod and adjacent the cutting tool of said internal trimmer means, to stabilize operation.

* * * * *